Aug. 6, 1929.　　　　I. M. PETERSIME　　　　1,723,806
INCUBATOR
Filed Jan. 12, 1926　　　3 Sheets-Sheet 1
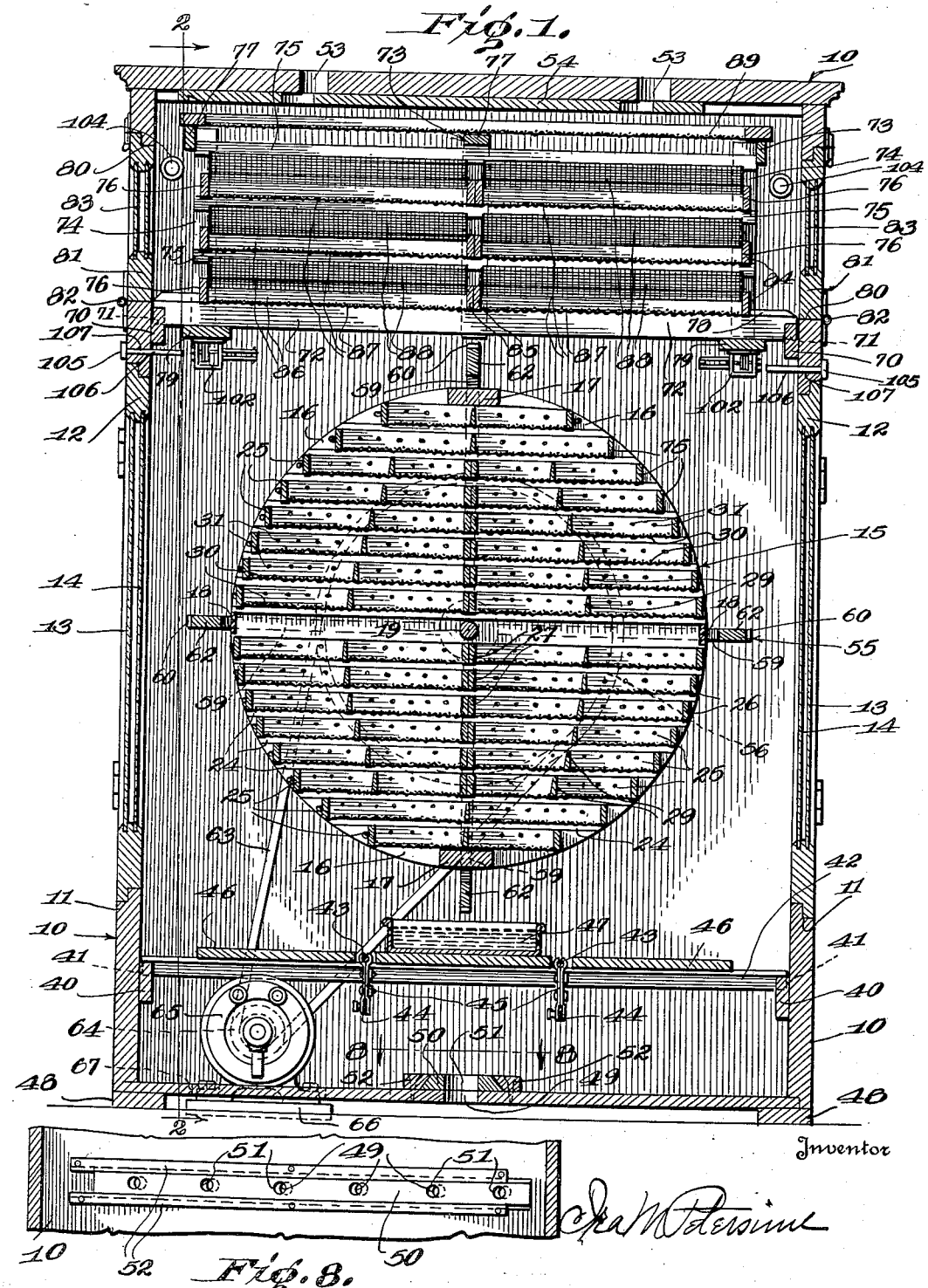
Inventor
Chas. M. Petersime

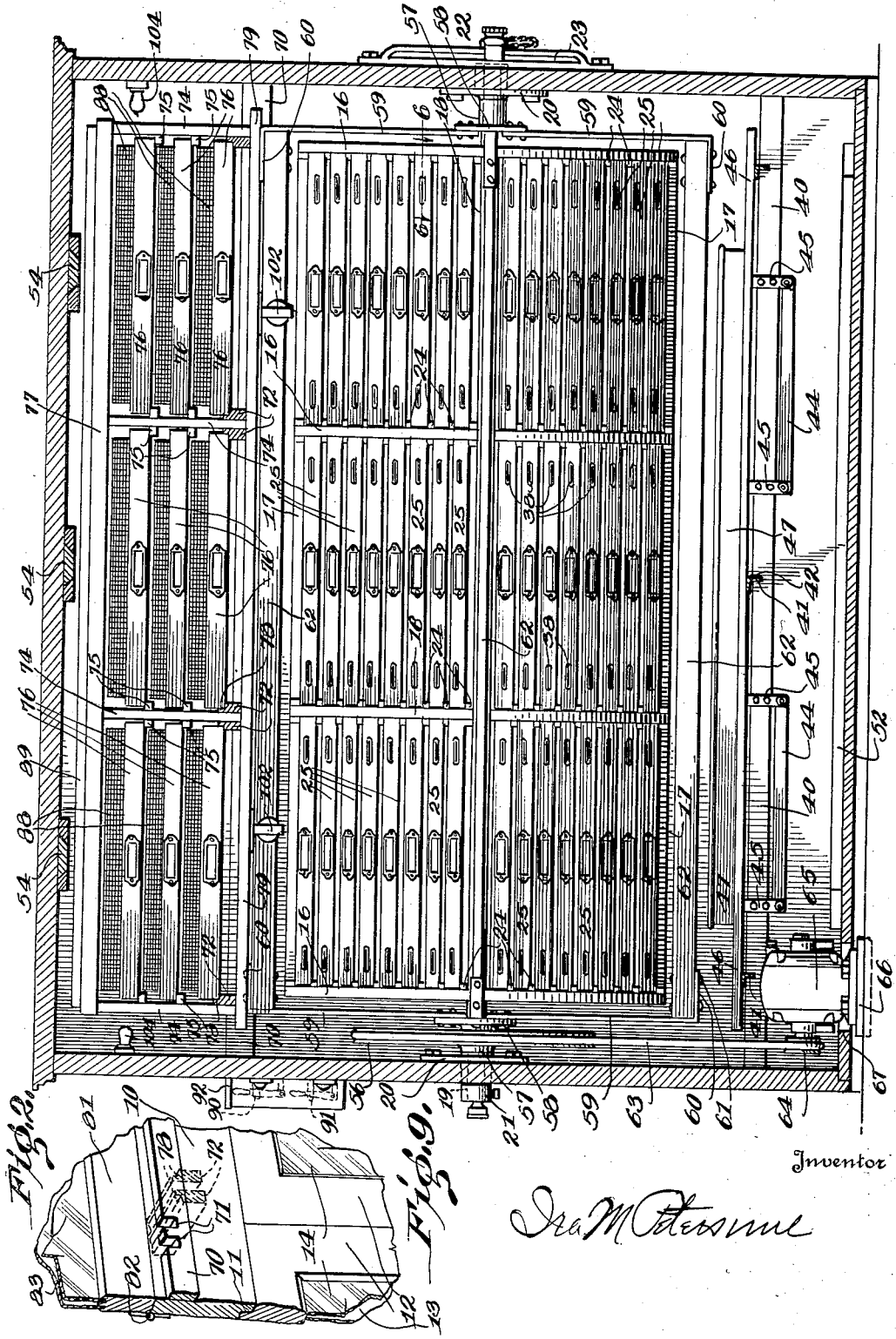

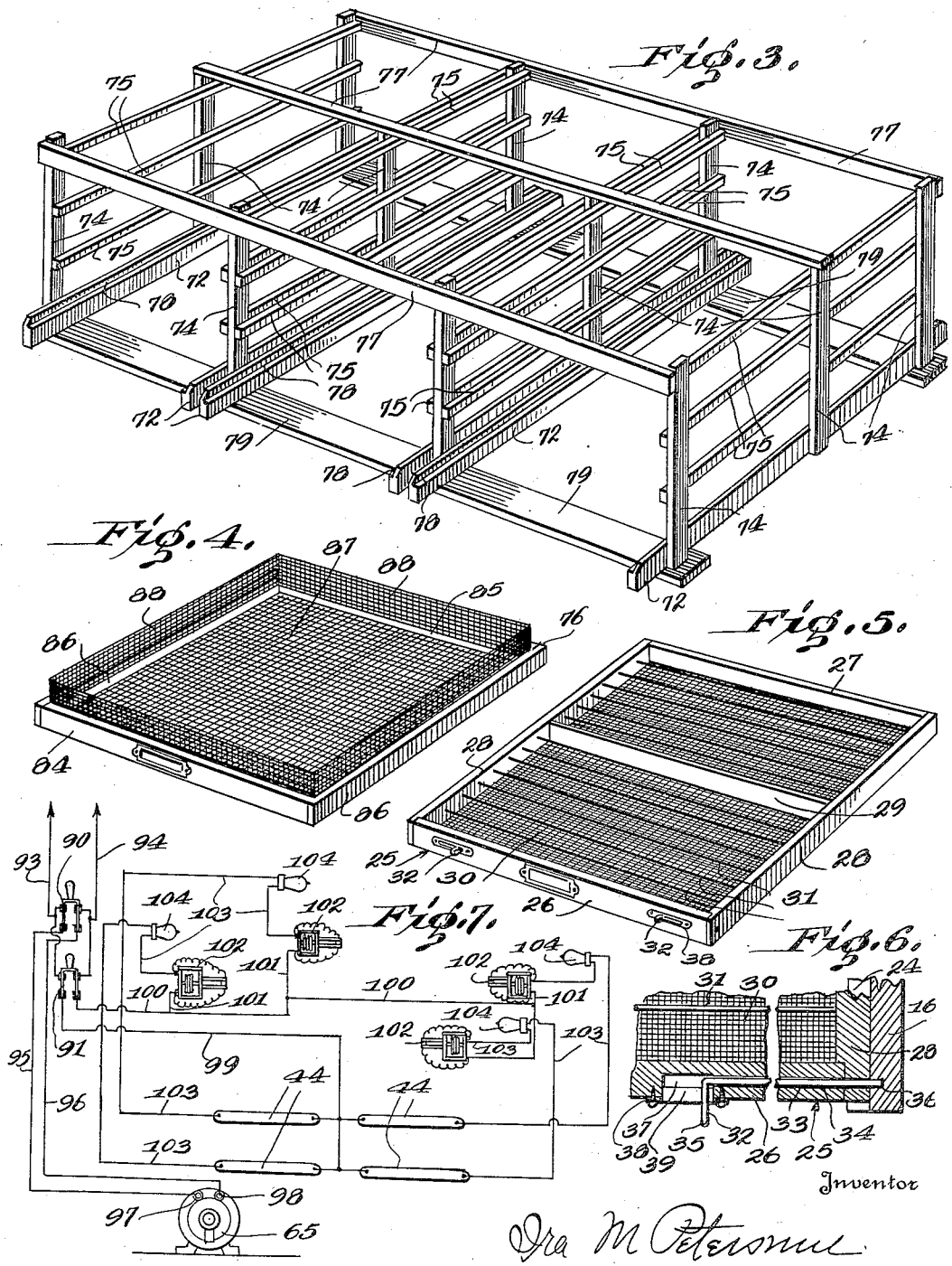

Patented Aug. 6, 1929.

1,723,806

UNITED STATES PATENT OFFICE.

IRA MELANCTHON PETERSIME, OF GETTYSBURG, OHIO.

INCUBATOR.

Application filed January 12, 1926. Serial No. 80,789.

The present invention relates to incubators, and aims to provide a novel and improved device of this character with a pivoted egg supporting frame or drum adapted to be turned on its pivot for turning the eggs contained therein, in connection with an air agitator rotatably mounted and arranged to move about the exterior of the egg supporting frame for maintaining an even temperature throughout the interior of the incubator.

Another object of the invention is the provision of a heater and a moisture trough positioned in the lower portion of the cabinet of the incubator in combination with the air agitator for traveling about an egg supporting member, said heater or heaters being positioned under a shield so as to prevent heat acting directly on the eggs in that portion of the drum which may be located adjacent the heater and cooperate with the moisture trough for slightly heating the liquid therein to cause slight vaporization thereof, said moisture trough being arranged so as to be in close proximity to the path of movement of the air agitator which will cause a slight draft thereover and under the shield as said agitator revolves, to effect complete mixture of moisture with heated air necessary for hatching eggs.

A further object of the invention is to provide a supporting frame or drum pivotally mounted in the cabinet of an incubator, said supporting frame or drum being constructed to receive egg trays from the opposite sides thereof, trays on one side of the supporting member forming abutments for trays on the opposite side for limiting inward movement of all of the trays, said cabinet having doors arranged at its opposite sides for permitting removal and replacement of trays to and from the supporting frame or drum.

A still further object of the invention is the provision of a detachable frame arranged in the upper portion of the cabinet for supporting hatching trays which receive the eggs from the rotatable supporting frame or drum just before the time of hatching, one of the aforesaid trays being arranged above another so that the bottom of one forms a closure for the tray therebeneath, each tray having screened extensions of the side walls thereof for permitting air to freely circulate through the trays, the uppermost of said trays being closed against escapement of newly hatched chicks by a screen supported thereabove, while all the trays are slidably mounted in the frame from opposite sides thereof and the frame positioned inwardly of the side walls of the cabinet to permit air to pass on all sides of the trays as well as therethrough.

A further object of the invention is to provide trays slidably arranged in the pivoted egg supporting frame or drum, each tray having means thereon for engaging the egg supporting frame for locking said trays against slidable movement when the tray supporting frame or drum is turned on its pivot for turning the eggs in said trays.

It is also an object of the invention to provide a device of the above indicated character, which is simple and substantial in construction, can be manufactured economically, and will be thoroughly efficient and practical in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein:

Figure 1 is a vertical cross section through my improved incubator,

Figure 2 is a vertical longitudinal section taken on line 2—2 of Figure 1,

Figure 3 is a perspective view of the frame for supporting the hatching trays positioned in the upper portion of the cabinet.

Figure 4 is a perspective view of one of the hatching trays,

Figure 5 is a similar view of one of the trays received in the pivotally mounted egg supporting member, Figure 6 is a fragmntary section taken on line 6—6 of Figure 2, Figure 7 is a wiring diagram illustrating the circuits to the heater and to the electric motor for operating the air agitator, Figure 8 is a fragmentary plan view of the bottom of the cabinet, as indicated by the numerals 8—8 on Figure 1 of the drawings, and Figure 9 is a fragmentary perspective view of a portion of a side wall of the cabinet.

Referring to the drawings, the numeral 10 designates the cabinet of the incubator, which is constructed of top, bottom, and side walls, the top and side walls being preferably provided with insulation as usual in structures of this character to retain the heat within the cabinet. Through the opposite side walls of the cabinet are relatively large openings 11 approximately midway of the height of the cabinet and adapted to be closed by doors 12, hinged to the cabinet and constructed similar to the walls of the cabinet. In order that the interior of the cabinet may be inspected without opening the doors 12, I have provided a pair of glass panels 13 and 14 in each door, said panels being slightly spaced from each other so as to form a dead air space therebetween to retain the heat in the cabinet.

Arranged in the cabinet at approximately the center thereof is a drum or frame 15, constructed of a series of spaced apart disks 16 held apart at the upper and lower ends by cross strips 17, and in order to further reinforce the disks in spaced relation metallic cross members 18 are provided at the sides of the drum and attached to each of the disks. To provide for rotatably supporting the frame in the cabinet an axle 19 extends centrally through the disks and is rotatably supported at its ends in journals 20 secured to the end walls of the cabinet, the disks being suitably fixed to the shaft for rotation therewith. The ends of the axle extend through the journals and beyond the sides of the cabinet, one of the projecting ends having secured thereto a collar 21, while the other end carries a lever 22, for turning the drum or frame. A quadrant 23 is attached to that side of the cabinet where the handle 22 is located and is provided with openings therein for registering with an opening in the lever so that a pin may be inserted through certain openings in the quadrant and through the opening in the lever in order to hold the drum against turning movement when in the proper adjusted position. The quadrant 23 is arranged so as to limit the movement of the handle 22 according to the desired turning of the drum.

On the inner faces of the two outermost disks 16 and on both faces of the intermediate disk of the drum are secured a series of strips 24 between which are slidably received egg trays 25. As the drum or frame 15 is of relatively large construction and circular in cross section, it will be noted that the egg trays 25 are of various depths and that the intermediate trays are in two sections which are slid into position from the opposite sides of the drum and abut against each other at the center thereof. It will be noted also by referring to Figure 1 of the drawings, that when all of the trays are in their proper positions, none of them protrudes beyond the periphery of the disks 16, and that due to the size of the drum or cylindrical frame 15, it is necessary to extend the intermediate trays only partially through the drum, as hereinbefore stated, otherwise they would be cumbersome or too heavy to properly handle. As the doors 12 are provided at both sides of the cabinet, the trays may be removed and replaced from either side thereof.

The trays 25 are each preferably rectangular in shape having a crosspiece 26 at the front, a cross piece 27 at the rear, and connecting side pieces 27, with an intermediate partition to brace the trays against twisting movement, as well as form an end support for the eggs in the separate compartments, and the bottoms 30 of said trays are preferably screen wire to permit air to pass through the trays. In order to properly support eggs in the trays in row formation, wires or the like 31 extend across the trays and have their opposite ends attached to the side walls 28.

By referring to Figure 1, it will be noted that all of the trays, with the exception of the two uppermost and two lowermost, extend into the drum from opposite sides to the center where they meet to limit their inward sliding movement, and for preventing the trays from sliding out of the drum during its turning movement each tray is provided with latches 32 slidable in opposite ends of the front cross-piece thereof to engage recesses 36 in the adjoining disks 16 of the drum (see Fig. 6), said latches comprising a rod or bar 33 slidable in the front cross-piece of the tray and bent at its inner end to provide a handle 35 which projects outwardly through a recess 37 in said cross-piece for operation of the latch. In order to retain the slidable bar against accidental sliding movement, a plate 38 is attached to the front cross piece and is provided with inturned flanges 39 extending into the recess 37 to frictionally engage the handle 35 of the bar and yieldably hold the same against such accidental movement. As all of the latching members 32 are of the same construction the description of one will apply to the others.

On the inner sides of the two side walls of the cabinet having the doors 12 therein and below the openings closed by said doors are attached strips 40, provided with a series of notches 41 at the upper edges thereof to receive the ends of angled members 42 extending across the cabinet to support longitudinal rods 43 carrying heating elements 44 attached to said rods by depending brackets 45, the heating elements being preferably of the electric-heater type and being spaced from each other in the lower portion of the cabinet. Also resting upon the angled members 42 are a series of boards, or the like, 46, at opposite sides of the rods 43 to form a shield for preventing eggs in the trays brought into position adjacent the heaters from being heated to a higher temperature than eggs in other portions of the supporting frame or drum. The intermediate board also forms a platform for supporting a moisture trough 47, which is adapted to be positioned beneath the egg supporting frame. It will be noted that by positioning the moisture trough adjacent the heaters the water or other liquid therein will be slightly heated so as to cause an efficient mixing of moisture with heated air as it rises from the heating units. By referring to Figure 2 of the drawings, it can be seen that a long trough is provided and that it is positioned between heaters and above the plane thereof.

The bottom of the cabinet is spaced slightly from the floor or any other object the cabinet is placed upon by providing cleats 48 at each side of the cabinet which will permit air to enter the cabinet through openings 49 in the bottom thereof. The openings 49 may be closed by means of a slidable member 50, provided with a series of openings 51 adapted to be brought in alignment with the openings 49 when it is desired to permit air to enter the cabinet. It can be seen that by only partially closing the openings 49 the amount of air entering the cabinet may be regulated. Retaining strips 52 are secured to the bottom of the cabinet for slidably supporting the slide 50 in the proper position. The top of the cabinet is also provided with a series of openings 53 which are adapted to be closed by a slide 54 similar to the slide on the bottom of the cabinet.

From the foregoing, it can be seen that fresh air is permitted to enter the bottom of the cabinet to be heated and mixed with moisture, and then slowly escapes from the top through the openings 53, due to the fact that the heated air will slowly rise.

In order to thoroughly mix the heated air and moisture and retain an even temperature throughout the entire interior of the incubator, I have provided an air agitator 55, which in operation is similar to the agitator shown in my patent No. 1,562,787. In this instance also the air agitator is rotatably mounted upon the ends of the axle 19 which pivotally supports the drum and is driven by a large belt pulley 56 fixed to one of a pair of hubs 57 loosely mounted on the shaft and interposed between said drum and ends of the cabinet, so that power may be transmitted to the agitating element for revolving the same independently of said drum. The agitating element comprises arms 59 which extend outwardly from the hubs beyond the periphery of the egg supporting drum and have their ends angularly bent, as at 60, for attachment thereto of blades 62 which extend the entire length of the drum and are adapted to move in a path adjacent the periphery of said drum. For revolving this air agitator, a belt 63 is trained over the belt pulley 56 and under a relatively small belt pulley 64 carried by an electric motor 65 positioned in the lower portion of the cabinet below the boards 46. The electric motor is supported upon a base 66 resting upon the floor and extends through an opening 67 provided in the bottom of the cabinet. By so mounting the motor any vibration thereof will not be transmitted to the cabinet which would be detrimental to hatching eggs. While the motor is shown projecting into the bottom of the cabinet, it is to be understood that it may be otherwise conveniently located and connected by belt to the agitator for revolving the same. It is also to be noted that the path of movement of the blades 62 of the air agitating element is adjacent the top of the moisture trough 47 so as to set up a slight draft over said moisture trough to effect a mixture of the moisture with the air within the cabinet, and that a slight draft will also be created at the sides and over the upper surfaces of the boards 46 above the heaters so as to more thoroughly mix heated air with the moisture and retain an even temperature throughout the entire interior of the cabinet.

At the inner sides of the side walls of the cabinet, slightly above the openings 11 therein, are strips or cleats 70 provided with notches 71 at their upper edges to receive the ends of cross-bars 72 supporting a stationary frame 73 which extends upwardly into the uppermost portion of the cabinet. Attached to the cross-bars or beams are uprights 74, to which are attached guide strips 75 for slidably supporting a series of matching trays 76. The upper ends of the uprights 74 are connected together by strips 77 to brace the upper ends of said uprights. The upper edges of the beams 72 are grooved, as at 78, so that said beams will also act as guides in slidably supporting the hatching trays. The opposite ends of the beams 72 of this stationary frame are connected together by boards 79 for holding said beams properly spaced and against movement with relation to each other. It is to be noted that the uprights are positioned inwardly a sufficient distance from the ends of the beams so that trays supported on the guide strips will be spaced from the side walls of the cabinet to permit air to freely circulate or pass around all of these trays. The trays supported in the frame 73 are what are termed the hatching trays, and may be removed from the cabinet through openings 80 provided in the opposite side walls thereof, said openings being closed by doors 81 hingedly connected to the cabinet, as at 82, and provided with spaced glass panels 83 therein for the purpose mentioned in respect to the glass panels in the doors 12. The hatching trays for this stationary frame are of similar construction to the trays carried by the rotatable drum, consisting of front and rear cross-pieces 84, 85, side pieces 86, and a screened bottom 87, with screened extensions 88 extending upwardly from each tray and terminating slightly below the bottom of the tray thereabove, thus preventing newly hatched chicks from escaping from a tray and falling to the bottom of the cabinet. There is a horizontal screen 89 above the uppermost pair of trays resting upon the strips 77 for preventing escape of chicks from said trays, and it will be noted that this screen 89 is removable. When the trays are positioned in the frame 73, they are a sufficient distance apart to permit air to freely pass or circulate about and through the same at all times, thus permitting the entire interior of the cabinet to be retained at the same temperature. The trays in the hatching frame are arranged somewhat similarly to the intermediate trays in the egg supporting drum 15, as trays placed in said frame through one door 81 abut against trays supported in the frame from the opposite side of the cabinet and by arranging the trays in this manner, it can be seen that they may be easily handled and still provide a structure whereby the trays are arranged compactly yet permit air to readily circulate through and around the same.

By constructing the stationary frame 73 in the manner described and detachably connecting it to the cabinet, it may be shipped separately if desired and easily assembled in the cabinet when the incubator is being erected.

The incubator is electrically operated, having electric heating units for heating the interior and an electric motor for revolving the agitating element, the circuit to the same being controlled by a pair of switches 90 and 91 preferably located at one end of the cabinet and contained in a switch-box 92, two of the terminals of each of said switches being connected to wires 93 and 94 leading to and from a suitable source of electric supply. Wires 95 and 96 extend from the other two terminals of switch 90 to the terminals 97 and 98 of motor 65 for controlling the operation of the same by said switch, while the other switch 91 controls the supply of current to the heating units and to the thermostats for regulating said heating units (see diagrammatic view Fig. 7), for which purpose one of the terminals of said last mentioned switch is connected by wire 99 directly to the heating units, and a wire 100 leading from the other terminal and tapped at several points, as at 101, for connection with the thermostats 102 and electric lights 104 in series with wire conductors 103 leading to the heating units 44 at the opposite ends thereof from the connection of wire 99 thereto, the electric lights serving to indicate when the heaters are in and out of operation. It can thus be seen that a thermostatic controlled regulator and a bulb 104 is arranged in each line leading to each heater, so that each heater is separately controlled. By separately controlling the heating units the operation of the regulators will not need to be exact, as all the regulators will not break the circuit at the same time. When one regulator breaks a circuit to a heater the temperature in the cabinet decreases as one heater is cut out. In this manner, it is not necessary for all the heaters to be cut off in order to change the temperature within the cabinet of the incubator. The thermostatic controlled regulators 102 are attached to the boards 79 of the frame 73 and their arrangement and adjustment are such as to operate at the proper temperature, while the electric bulbs 104 are positioned in the uppermost portion of the cabinet and the lights therefrom will be visible through the glass panels 83 in the doors 81.

Extending through the opposite side walls of the cabinet are thermometers 105 having the portion 106 which extends through opening 107 in the wall of the cabinet and carries the bulb bent at an angle to the outer portion, said thermometers permitting the temperature within the interior of the incubator to be read from the exterior thereof. The bulbs of the thermometers are arranged adjacent the thermostatic controlled regulators so as to indicate the temperature around said regulators, whereby should the regulators get out of order, the attendant will understand that the circuits to the electric heaters require attention.

In operation, the trays 25 in the drum are removed for placing the eggs therein, and when filled are slid back into the drum, the intermediate trays at one side abutting against the trays at the opposite side of the drum, and the latches 32 are then slid so as to hold the trays against outward sliding movement. As the two uppermost and two lowermost trays do not abut against other trays, it is necessary to slide the same in the drum until the latches can properly engage into the recesses in the disks 16. After all of the trays containing eggs are positioned in the drum the doors are then closed and latched, the switches 90 and 91 turned on so as to permit current to flow to the electric heating elements 44 and to the motor 65 for driving the air agitator. When the temperature within the cabinet or incubator reaches an excessive point, the thermostatic controlling regulators 102 will break the circuits to the respective heating elements, thus cutting off said heaters until the temperature has fallen, at which point the regulators will again close a circuit to the heaters.

By manipulating the slides 51 and 54 the entrance and exit of air to and from the cabinet may be regulated so as to avoid making and breaking of the circuits too often by the thermostatic controlling regulators. When the eggs contained in the trays of the drum have remained in one position for a certain length of time they may be turned by removing the pin extending through the handle 22 and swinging the handle to its other extreme position, thus causing the turning of the drum and eggs contained in the trays carried by said drum. It has been found that it is only necessary to turn the eggs twice a day in order to obtain the best results.

During the hatching of the eggs the air agitating element 55 operated by the electric motor constantly travels around the exterior of the egg supporting drum mixing moisture with the air heated by the heating units so that the entire interior of the incubator is maintained at an equal temperature. As before mentioned the blades of the air agitator move in a path in close proximity to the moisture trough and pass through the rising heated air from the electric heaters so as to slightly stir the air, thus causing a complete mixture of heated air and moisture within the cabinet.

After the eggs have remained in the egg supporting drum for a certain designated time, namely eighteen days, they are removed and placed in the hatching trays 76 supported by the stationary frame in the upper end of the incubator, which have the side walls thereof constructed of greater height so as to assist in the hatching of the eggs. As the screened side portions 88 of these trays extend upwardly to near the bottom of the trays the newly hatched chicks are prevented from escaping from the trays and falling to the bottom of the incubator, while the horizontal screen 89 above the upper pair of trays prevents escape of the newly hatched chicks from these trays. As the eggs are hatched, the newly born chicks are removed from the hatching trays by sliding said trays outwardly through the openings 80 in the opposite side walls of the cabinet.

The diffusion of the warm air and the equalization of the temperature are accomplished by the location of the heating elements and by the rotating of the agitator. Contrary to most incubators constructed, the heating of the air takes place at the bottom of the cabinet and this gives a natural upward diffusion of the heat. The moisture pan and platform supporting the same, as well as the platform at the sides of the pan or trough being located directly over the heating units act as a baffle plate to direct the heat outward, where it is acted on by the blades of the agitator. Thus the heat is not permitted to ascend directly to the egg supporting drum.

From the construction shown and described, it can be seen that the stationary frame supporting the hatching trays, the rotatable drum supporting the eggs during incubation and the structure in the lower portion of the cabinet may be removed and the four sides, as well as the top and bottom of the cabinet can be disconnected and stacked to provide a compact arrangement for shipping the incubator. This is a very important feature, as large incubators of this general type must necessarily be assembled at the place where they are to be used.

By providing doors at opposite sides of the cabinet for the purpose of placing the trays in the rotatable drum and stationary frame a large incubator of this kind permits convenient handling of the great quantity of eggs being hatched, as well as proper care of the chicks and their removal from the cabinet.

In order that my improved incubator may be run to full capacity, only a few of the trays 25 in the drum 15 are filled with eggs when first starting the incubator, other trays being filled successively twice a week. By doing this, the party operating the incubator may fill the same as the eggs are laid, and not wait until a sufficient number of eggs are collected to entirely fill the drum at one time. After the eggs first placed in the drum have remained there for eighteen days they are removed and placed in the hatching trays 76, it not being necessary to turn them after that time. The incubator can then be run at full capacity, that is by placing new eggs in the trays 25 for those transferred to the hatching trays, as the eggs in the hatching trays are usually hatched after three days. By operating the incubator in this manner the eggs placed in the trays 25 of the drum may be compactly arranged so that a maximum number will be supported therein during incubation, and the capacity of the hatching trays is such as to take care of the hatching of the eggs transferred thereto from said drum.

Having thus described my invention, what I claim as new is:

1. An incubator comprising a cabinet, an egg supporting frame therein, a heater in the lower part of the cabinet, a moisture pan above the heater, plate extensions at opposite sides of the pan adapted to deflect the heated air arising from said heater, and an agitator traveling around said egg supporting frame, the path of the agitator being in close proximity to said heater and moisture pan to thoroughly mix moisture with the heated air and maintain a uniform temperature in all parts of the cabinet.

2. An incubator comprising a cabinet, an egg supporting frame therein, a heater in the lower part of the cabinet, means for deflecting the heat from said heater towards the sides of the cabinet, a moisture pan in said cabinet, and means movable around said egg supporting frame, the path of movement of said movable means being in close proximity to the heater and moisture pan so as to create a slight draft around said heater and in said pan for causing the mixture of moisture with the heated air as said movable means passes around said egg supporting member.

3. An incubator comprising a cabinet, an egg supporting frame supported therein, a moisture pan in said cabinet, a heater in the cabinet, a shield between said heater and said egg supporting frame, and means movable around said egg supporting frame for creating a slight draft at the ends of said shield and around the heater and also in the moisture pan for causing moisture to be mixed with heated air as said movable means passes around the egg supporting frame.

4. An incubator comprising a cabinet, an egg supporting frame supported therein, a platform in the lower portion of the cabinet below said egg supporting frame, a moisture pan on said platform, a heater below said platform, and an air agitator traveling around the egg supporting frame, the path of the agitator being in close proximity to the moisture pan.

5. An incubator comprising a cabinet, an egg supporting frame therein, a platform in the lower portion of the cabinet arranged below said egg supporting frame and extending partially across the cabinet, a moisture pan positioned upon said platform, a heater below said platform, and an air agitator traveling in close proximity to said moisture pan and heated air rising around the sides of said platform.

6. An incubator comprising a cabinet, an egg supporting frame therein, cross pieces extending across the cabinet at the lower portion thereof below said egg supporting frame, planks resting upon said cross pieces, a moisture trough positioned upon one of said planks, heating elements suspended from said cross pieces, and an air agitator traveling in close proximity to said trough for mixing moisture with the heated air rising from said heaters.

7. An incubator comprising a cabinet, an egg supporting frame therein, a series of cross pieces extending across said cabinet, planks resting upon said cross pieces, a moisture trough positioned upon one of said planks below said egg supporting frame, bars resting upon said cross pieces between said planks, and heating elements suspended from said bars below said planks, the planks terminating short of the sides of the cabinet, and an air agitator traveling about the egg supporting frame and in close proximity to the moisture trough so as to mix moisture with the heated air rising around the sides of said planks as said agitating element revolves.

8. An incubator comprising a cabinet, an egg supporting frame therein, a platform in the lower portion of the cabinet below said egg supporting frame and terminating short of the sides of said cabinet, the cabinet having air openings in the bottom thereof below said platform, heating elements in said cabinet below the platform for heating the air entering through said air openings, a moisture trough upon said platform below the egg supporting frame, and air agitating means traveling in close proximity to said moisture trough and through the air rising around the sides of said platform so as to thoroughly mix moisture with heated air.

9. An incubator comprising a cabinet opening through opposite sides of the cabinet covered by doors, an egg supporting frame in the cabinet mounted for turning movement and consisting of spaced apart disks and trays slidably mounted between said disks at the opposite sides of the frame, the intermediate trays at one side abutting against the trays at the other side for limiting inward movement of the trays, and means on said trays engaging the disks for locking the same against outward sliding movement.

10. An incubator comprising a cabinet, a drum in said cabinet mounted for turning movement, trays slidably arranged in said drum, said trays having recesses formed in the forward walls thereof, bars slidably mounted in said recesses and having angled extensions thereon for forming hand engaging portions, said bars being adapted to engage with said drum for preventing sliding movement of said trays upon turning movement of the drum, and spring means for engaging the extensions of said bars for yieldably holding the same in either locked or unlocked position.

11. An incubator comprising a cabinet, a drum in said cabinet mounted for turning movement, trays slidably arranged in said drum, said trays having recesses formed in the forward walls thereof, bars slidably mounted in said recesses and having angled extensions thereon for forming hand engaging portions, said bars being adapted to engage with said drum for preventing sliding movement of said trays upon turning movement of the drum, plates arranged upon the forward walls of said trays having inturned flanges for frictionally engaging the angled extensions of the bars for yieldably holding said bars against sliding movement.

12. An incubator comprising a cabinet, an egg supporting frame mounted therein, a series of electric heaters arranged in said cabinet adjacent the lower portion thereof beneath the egg supporting frame, a series of thermostatic controlled regulators arranged in the cabinet slightly above and to the sides of the egg supporting frame, said regulators being arranged one in line with each heater for making and breaking an electric circuit to its respective heater upon change of temperature in said cabinet, and means constantly travelling about the egg supporting frame for mixing the heated air with the air in the cabinet.

In testimony whereof, I have affixed my signature.

IRA MELANCTHON PETERSIME.